(12) United States Patent
Aste et al.

(10) Patent No.: US 11,332,188 B2
(45) Date of Patent: May 17, 2022

(54) STEERING KNUCKLE ASSEMBLY AND METHOD OF ASSEMBLING A STEERING KNUCKLE ASSEMBLY

(71) Applicant: Dana Italia S.r.l., Arco (IT)

(72) Inventors: Carlo Aste, Rovereto (IT); Fabrizio Denei, Riva del Garda (IT); Nicola Tessaro, Riva del Garda (IT)

(73) Assignee: Dana Italia S.r.l., Trento (IT)

( * ) Notice: Subject to any disclaimer, the term of this patent is extended or adjusted under 35 U.S.C. 154(b) by 0 days.

(21) Appl. No.: 17/073,469

(22) Filed: Oct. 19, 2020

(65) Prior Publication Data
US 2021/0188351 A1 Jun. 24, 2021

(30) Foreign Application Priority Data
Dec. 20, 2019 (EP) .................................... 19218451

(51) Int. Cl.
*B62D 7/18* (2006.01)
*B60R 17/00* (2006.01)

(52) U.S. Cl.
CPC .............. *B62D 7/18* (2013.01); *B60R 17/00* (2013.01)

(58) Field of Classification Search
CPC .......... B62D 7/18; F16C 11/02; F16C 11/045; F16C 2326/24
USPC .................................................. 280/93.512
See application file for complete search history.

(56) References Cited

U.S. PATENT DOCUMENTS

| | | | |
|---|---|---|---|
| 3,472,331 A | 10/1969 | Baker et al. | |
| 3,981,513 A * | 9/1976 | Erskine | B62D 7/06 280/93.512 |
| 4,733,744 A * | 3/1988 | Glaze | B60K 17/30 180/256 |
| 4,915,530 A * | 4/1990 | Tomlinson | B62D 7/18 280/93.512 |
| 5,340,137 A | 8/1994 | Carraro et al. | |
| 5,722,784 A * | 3/1998 | Link | F16C 33/6607 403/158 |
| 5,975,547 A * | 11/1999 | Stroh | B62D 7/18 280/93.512 |
| 6,203,038 B1 * | 3/2001 | Bernhard | B62D 1/20 280/93.502 |
| 7,232,140 B2 * | 6/2007 | Hamperl | B62D 7/18 280/124.113 |
| 9,579,974 B2 * | 2/2017 | Bittlingmaier | B60B 35/122 |

OTHER PUBLICATIONS

European Patent Office, European Search Report issued in application No. EP19218451.3, dated Jun. 25, 2020, 7 pages, The Hague, Netherlands.

* cited by examiner

*Primary Examiner* — Toan C To
(74) *Attorney, Agent, or Firm* — Marshall & Melhorn, LLC

(57) ABSTRACT

A steering knuckle assembly for a vehicle may have a steering knuckle with a first blind hole formed in a surface of the steering knuckle and a first king pin defining a rotation axis and non-rotatably mounted in the first blind hole.

15 Claims, 5 Drawing Sheets

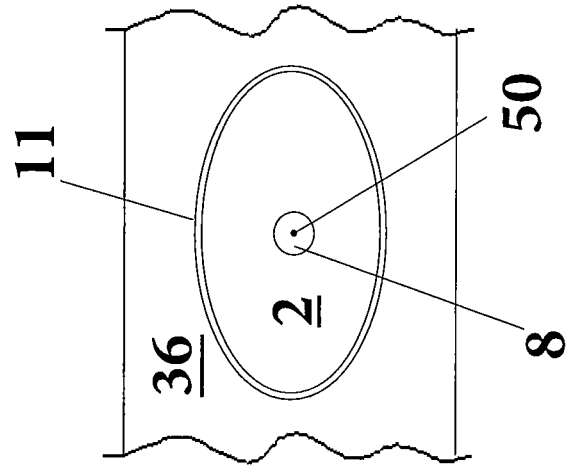
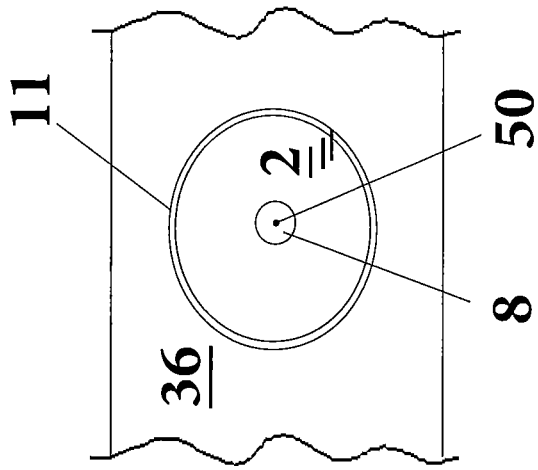

STEERING KNUCKLE ASSEMBLY AND METHOD OF ASSEMBLING A STEERING KNUCKLE ASSEMBLY

FIELD

The present document relates primarily to a steering knuckle assembly and to a method of assembling a steering knuckle assembly. Steering knuckle assemblies of the presently proposed type may find application in vehicles, for example in heavy-duty vehicles such as heavy trucks, busses, vans or the like.

BACKGROUND

It is commonly known that steering mechanisms for vehicles, for example for heavy-duty vehicles such as heavy trucks, may be realized by rotatably mounting a steering knuckle on an axle using one or more king pins. Typically, a king pin is an elongate member made of metal such as steel used for providing a rotatable connection between two components. For example, U.S. Pat. No. 3,472,331 relates to a steering drive axle assembly for a vehicle comprising two king pins, a steering knuckle and an axle member.

The king pins are rotatably mounted on the steering knuckle and non-rotatably mounted on the axle member. Bearings mounted on the steering knuckle facilitate rotation of the steering knuckle relative to the axle member. Replacing the steering knuckle according to U.S. Pat. No. 3,472,331 requires replacing or at least demounting the bearings that are mounted on the steering knuckle.

SUMMARY

Thus, there is a demand for steering knuckle assemblies that can be maintained and repaired easily and at low cost.

This object is solved by a steering knuckle assembly and by a method of assembling a steering knuckle assembly according to the independent claims. Special embodiments are described in the dependent claims.

The presently proposed steering knuckle assembly for a vehicle, in particular for a heavy-duty vehicle, comprises a steering knuckle having a first blind hole formed in a surface of the steering knuckle, and a first king pin defining a rotation axis and non-rotatably mounted in the first blind hole. Typically, the steering knuckle and the first king pin are made of or at least partially made of metal such as steel. The first king pin may be non-rotatably mounted on the steering knuckle in a simple manner and at low cost. For example, no bearing needs to be mounted on the steering knuckle for facilitating rotation of the steering knuckle relative to an axle member.

Also, since the first king pin is non-rotatably mounted in the first blind hole of the steering knuckle, the first king pin does not extend through the steering knuckle, thereby saving space in a height or vertical direction of the steering knuckle assembly. Within the scope of this document, a blind hole is a hole which does not break through a workpiece such as the steering knuckle. The height or vertical direction of the steering knuckle typically points in a direction parallel to the rotation axis defined by the first king pin and/or parallel to the yaw axis of the vehicle.

Mounting the first king pin in the first blind hole may reduce a vertical space required for mounting the first king pin on the steering knuckle, in particular when the first blind hole faces upward and the steering knuckle assembly is designed such that the steering knuckle is part of a lowermost portion of the steering knuckle assembly in a direction parallel to the rotation axis. Consequently, a vehicle with the presently proposed steering knuckle assembly and demounted wheels may have a reduced height, thereby potentially facilitating transportation or shipping and lowering transportation or shipping costs.

The first king pin may be mounted in the first blind hole via a press fit. For example, the press fit connection may provide a compressive force between a portion of the steering knuckle delimiting the first blind hole and the first king pin in a direction perpendicular to the rotation axis. The compressive force then fixes the first king pin with respect to the steering knuckle along the rotation axis through friction between the steering knuckle and the first king pin. A press fit connection between the first king pin and the steering knuckle may decrease manufacturing costs, for example. Moreover, mounting of first king pin on the steering knuckle via a press fit may be achieved without additional fixing elements which may protrude from the steering knuckle toward the ground in a vertical direction, thereby saving vertical space.

The first blind hole may have a non-circular cross section in a plane perpendicular to the rotation axis, and a portion of the first king pin mounted in the first blind hole may have a correspondingly shaped non-circular cross section, such that the first king pin and the steering knuckle are engaged with one another in a torque-proof form fit with respect to the rotation axis. Examples for non-circular shapes are oval, angular, polygonal, star-shaped, or the like. This way, a particularly stable torque proof connection between the first king pin and the steering knuckle may be provided without requiring additional vertical space.

The steering knuckle assembly may further comprise an axle member, the first king pin rotatably connecting the steering knuckle with the axle member. For example, the axle member may comprise an axle housing for housing a drive shaft and/or a differential. For instance, the axle member may be configured as an arm-modular axle. The axle member may be made of or may be at least partially made of metal such as steel.

The axle member may comprise a second blind hole formed in a surface of the axle member. The second blind hole is then typically arranged coaxially with respect to the rotation axis. A portion of the first king pin may protrude out of the first blind hole and may be rotatably mounted in the second blind hole, thereby providing a rotatable connection between the steering knuckle and the axle member. For example, a bearing such as a roller bearing may be mounted or received in the second blind hole, and the portion of the first king pin protruding from the first blind hole may be mounted or received in said bearing to facilitate rotation of the first king pin with respect to the axle member.

The steering knuckle assembly may further comprise a second king pin coaxial with the rotation axis. The second king pin may rotatably connect the steering knuckle with the axle member. The second king pin may be made of metal such as steel. For example, two short king pins may require less material than a single long king pin, thereby reducing material and production costs. Further, in some embodiments the two king pins may be arranged only at the interfaces between the steering knuckle and the axle member, thereby allowing a clearance to be left between the first king pin and the second king pin along the rotation axis.

The axle member may further comprise a third blind hole coaxial with the rotation axis, wherein the second king pin may be mounted in the third blind hole.

The second blind hole and the third blind hole may face in opposite directions, preferably away from one another, along the rotation axis. For example, the second blind hole may face downward and the third blind hole may face upward along the vertical direction.

The second king pin may be non-rotatably mounted on the steering knuckle and rotatably mounted on the axle member. For example, the second king pin may be fixed with respect to the steering knuckle by means of fixing members such as screws or bolts. Additionally or alternatively, the second king pin may be fixed with respect to the steering knuckle via a press fit connection as described above with respect to the first king pin. A further bearing such as a roller bearing may mounted on the axle member, for example in the third blind hole, and the second king pin may be rotatably mounted or received in said further bearing to facilitate rotation of the steering knuckle with respect to the axle member.

The steering knuckle and the axle member may be configured such that they form a clearance in between the first king pin and the second king pin along the rotation axis so that a drive shaft or joint may pass through the clearance. For example, the steering knuckle assembly may further comprise a vehicle wheel and a drive shaft or joint drivingly engaged with the vehicle wheel. The steering knuckle may be configured to steer the vehicle wheel. For example, the vehicle wheel may be mounted on a wheel hub that is connected to or mounted on the steering knuckle. The drive shaft or joint may pass through the clearance formed in between the first king pin and the second king pin along the rotation axis.

The steering knuckle may comprise a first arm portion extending at least partially perpendicular to the rotation axis, a second arm portion extending at least partially perpendicular to the rotation axis, and a connecting portion connecting the first arm portion and the second arm portion. For example, a cross section of the steering knuckle including the first arm portion, the second arm portion and the connecting portion may have a U-shape in a plane parallel to the rotation axis. The first king pin may be mounted on the first arm portion, the second king pin may be mounted on the second arm portion, and the axle member may be disposed in between the first arm portion and the second arm portion along the rotation axis. Disposing the axle member between the arm portions of the steering knuckle along the rotation axis may facilitate assembly of the steering knuckle assembly.

The steering knuckle, and in particular the above-mentioned first arm portion of the steering knuckle may comprise a through hole, in particular a through hole coaxial with the rotation axis. For example, the second king pin may then be mounted in and reach through the through hole of the steering knuckle.

A cross section of the axle member in a plane parallel to the rotation axis may likewise have a U-shape including a first and a second arm portion and a connecting portion connecting the first and the second arm portion. Alternatively, when the axle member has the above-described U-shape, in some embodiments the steering knuckle may be disposed in between the arm portions of the U-shape axle member along the rotation axis. And in some embodiments, when both the steering knuckle and the axle member have a U-shape cross section in a plane parallel to the rotation axis, the arm portions of the U-shape steering knuckle and the arm portions of the U-shape axle member may be arranged alternatingly along the rotation axis.

The steering knuckle assembly may comprise a first lubrication channel extending at least partially through the steering knuckle and a second lubrication channel in fluid communication with the first lubrication channel and extending at least partially through the first king pin. The first lubrication channel and the second lubrication channel may be configured to provide lubricant to an outside of the first king pin, in particular to the portion of the king pin projecting or protruding from the first blind hole and rotatably mounted on the axle member. The first lubricant channel may be arranged perpendicular or at least partially perpendicular to the second lubricant channel. For example, the first lubricant channel may extend or may at least partially extend in a direction perpendicular to the rotation axis, and the second lubricant channel may extend or may at least partially extend in a direction along the rotation axis. The above-described arrangement of lubricant channels typically does not require additional vertical space. The steering knuckle assembly may further comprise a greaser. The greater may be integrated in the steering knuckle and may extend in a direction perpendicular to the rotation axis.

Further, a method of assembling a steering knuckle assembly such as the above-described steering knuckle assembly is presently proposed. The method comprises the steps of non-rotatably mounting a first king pin in a first blind hole formed in a surface of a steering knuckle, the first king pin defining a rotation axis. The first king pin may be non-rotatably mounted in the first blind hole via a press fit between the steering knuckle and the first king pin.

The method may further comprise the step of rotatably mounting a portion of the first king pin protruding out of the first blind hole in a second blind hole of an axle member, wherein the second blind hole is formed in a surface of the axle member and arranged coaxially with respect to the rotation axis and/or the first blind hole.

The steering knuckle may be rotatably connected with the axle member via or by means of a second king pin. For example, the second king pin may be mounted in a third blind hole formed in a surface of the axle member.

Furthermore, the method may comprise the steps of passing a drive shaft or a joint through a clearance formed in between the first king pin and the second king pin along the rotation axis, wherein the drive shaft or the joint is drivingly engaged with a wheel hub that is configured to be steered by the steering knuckle. For example, the wheel hub may be connected to or mounted on the steering knuckle. The drive shaft or joint may then directly transmit rotational energy to the wheel hub and to a wheel mounted on the wheel hub.

The method may further comprise the step of disposing the axle member between arm portions of the steering knuckle, which may facilitate assembly of the steering knuckle assembly.

Additionally or alternatively, the method may comprise forming a first lubrication channel in the steering knuckle and forming a second lubrication channel in the first king pin such that the second lubrication channel is in fluid communication with the first lubrication channel, and such that the first and the second lubrication channel are configured such that lubricant may be provided to an outside of the first king pin via the first and the second lubrication channel.

BRIEF DESCRIPTION OF THE FIGURES

Embodiments of the presently proposed steering knuckle assembly and method of assembling a steering knuckle assembly are described in the following detailed description and are depicted in the Figures, in which

FIGS. 5A, 5B show a top view of the A-A plane of the first blind hole of FIG. 1 in two different configurations.

DESCRIPTION

The Figures show one proposed embodiment of a steering knuckle assembly which is drawn to scale. However, the presently proposed steering knuckle assembly shall not necessarily be limited to the drawn scale and may be realized using other dimensions, in particular other relative dimensions.

Figure 1:
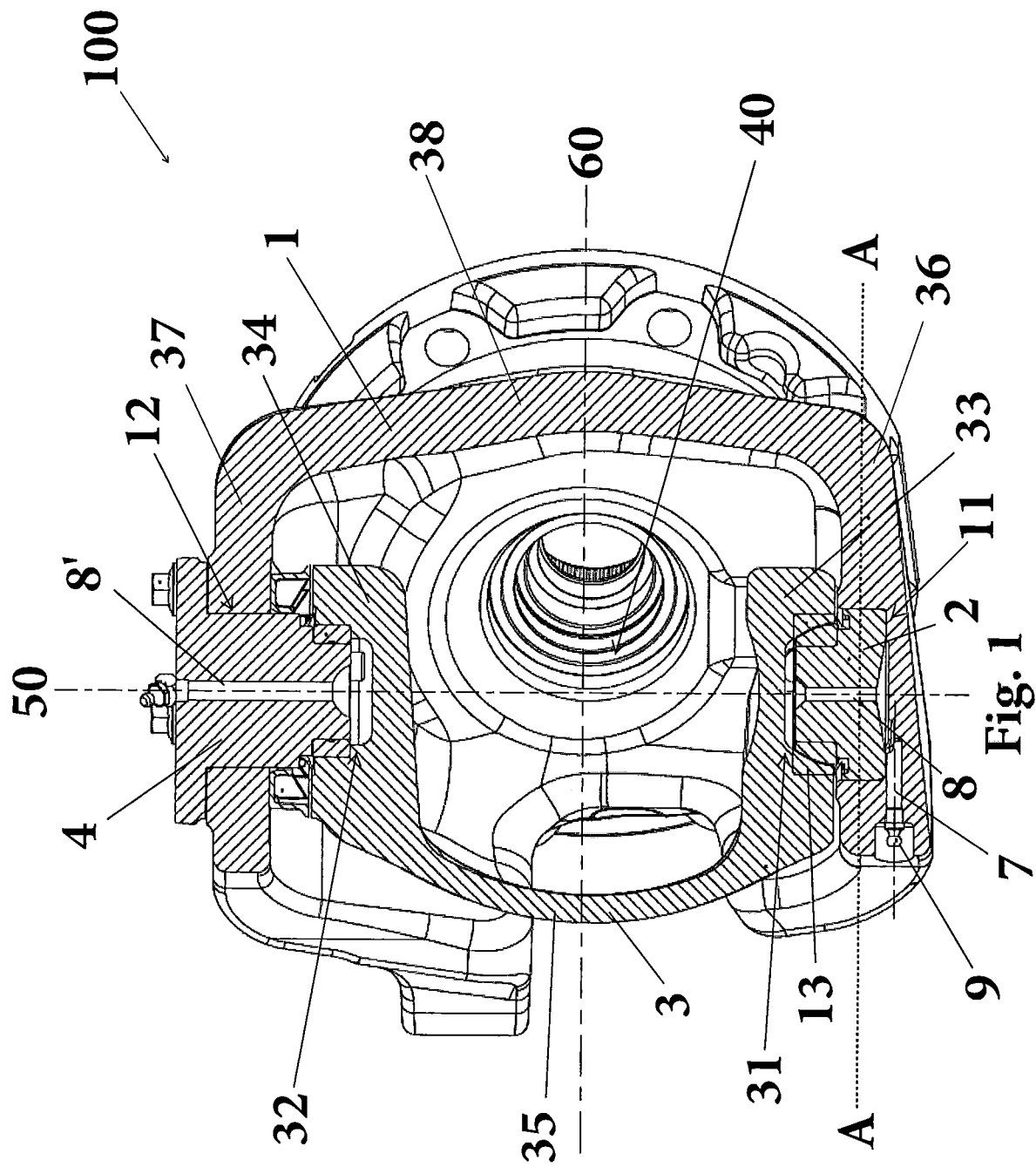
FIG. 1 shows a sectional view of an embodiment of a steering knuckle assembly for a vehicle of the presently proposed type.
Figure 2:
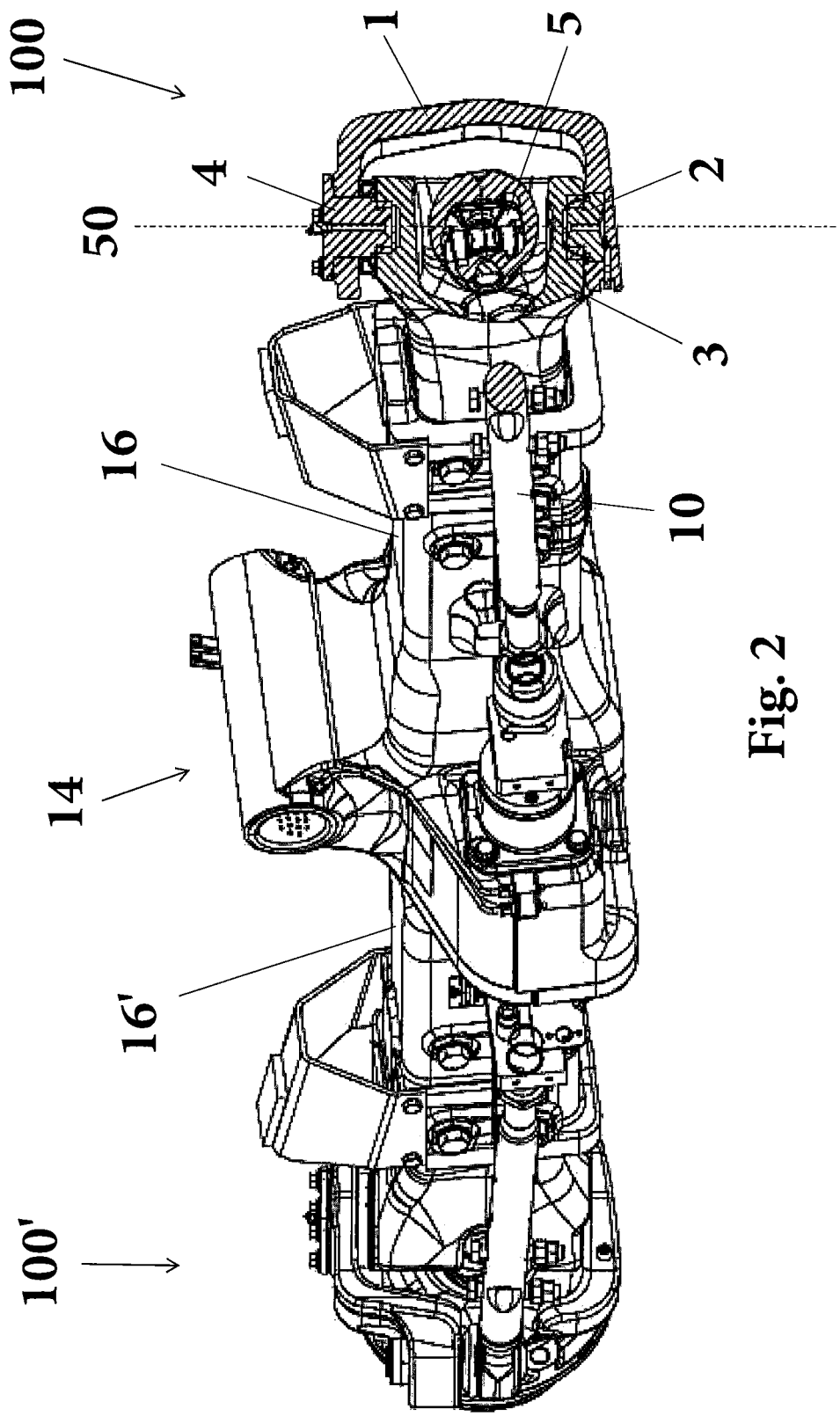
FIG. 2 shows a sectional view of an axle assembly including the steering knuckle assembly of FIG. 1.
Figure 3:
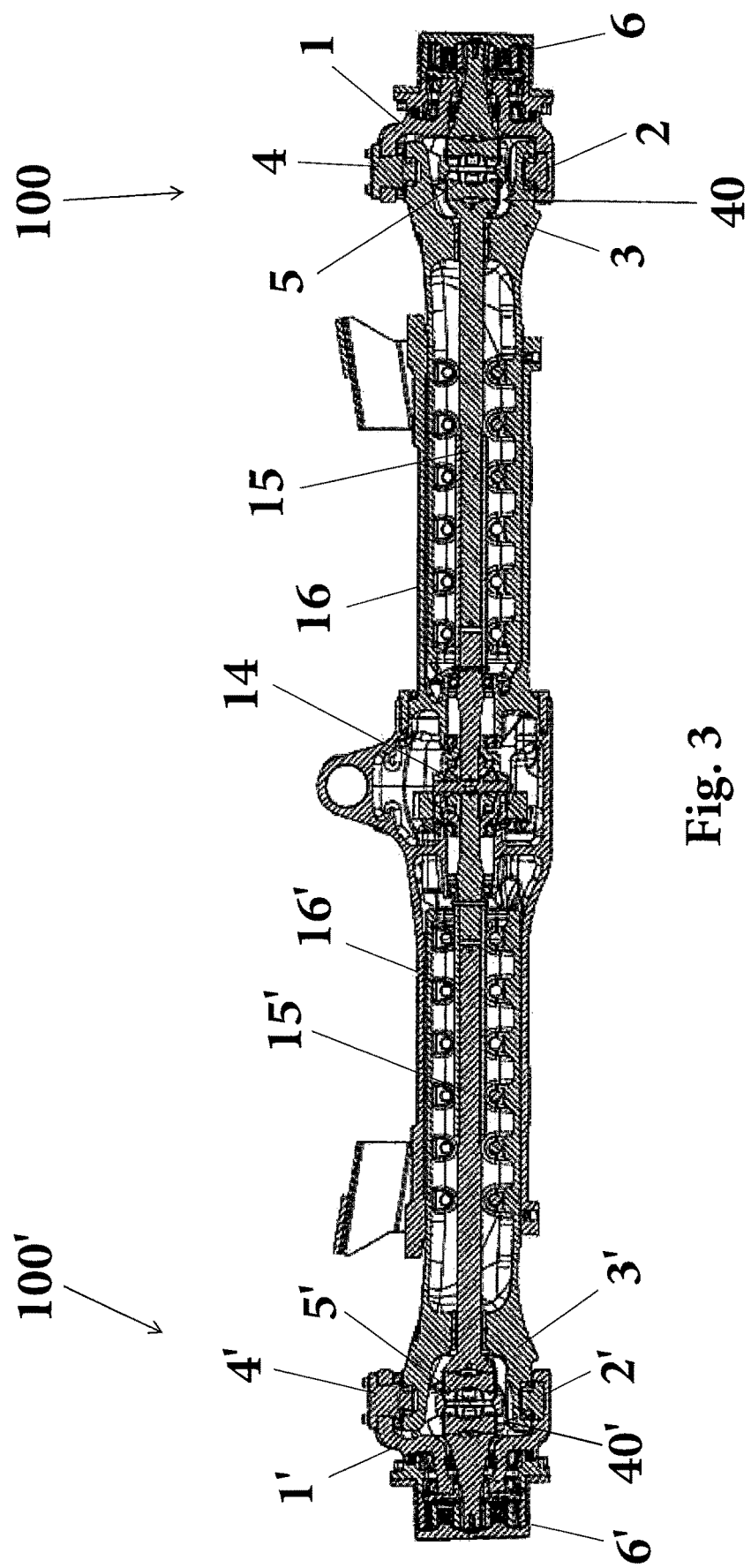
FIG. 3 shows a sectional view of the axle assembly of FIG. 2, wherein the axle assembly includes two steering knuckle assemblies on opposite ends of a vehicle axle.

FIG. 1 shows a sectional view of an embodiment of a steering knuckle assembly 100 for a vehicle of the presently proposed type, in particular a truck with at least 5 tons, and FIGS. 2 and 3 show sectional views of an axle assembly including the steering knuckle assembly 100 of FIG. 1, wherein the same features recurring in different Figures are designated with the same reference signs. In particular, the hatched areas of the steering knuckle assembly 100 highlighted in FIG. 2 correspond with the hatched areas of the steering knuckle assembly 100 highlighted in FIG. 1.

The steering knuckle assembly 100 comprises a steering knuckle 1 and an axle member 3. The steering knuckle 1 is rotatably connected to the axle member 3 through a first king pin 2 and through a second king pin 4. The king pins 2, 4 define a rotation axis 50 and are disposed coaxially with respect to the rotation axis 50. Using two separate king pins 2 and 4 rather than a single king pin for rotatably connecting the steering knuckle 1 with the axle member 3 potentially allows each individual king pin 2, 4 to be of a smaller size, for example with regard to the length and/or the diameter of the king pin. For instance, in the embodiment depicted in FIG. 1 the two separate king pins 2, 4 are disposed only at the interfaces between the steering knuckle 1 and the axle member 3, respectively.

The steering knuckle assembly 100 may further include a wheel hub 6 and a vehicle wheel mounted on the wheel hub 6, as illustrated in FIG. 3, for example. The steering knuckle 1 may then be connected to the wheel hub 6 for steering the vehicle wheel mounted on the wheel hub 6. The rotation axis 50 is then typically arranged perpendicular to a rotation axis of the vehicle wheel. The axle member 3 may house an axle have shaft 15, as illustrated in FIG. 3, for example. In the embodiment of the steering knuckle assembly 100 depicted in the Figures, the axle member 3 may be configured as an arm-modular axle, for instance. Here, the steering knuckle 1, the axle member 3, and the king pins 2, 4 may be made of a metal such as steel. However, it is understood that in alternative embodiments the steering knuckle 1, the axle member 3, and the king pins 2, 4 may be made of or may comprise other materials.

FIG. 1 illustrates that the steering knuckle 1, and in particular a cross section of the steering knuckle 1 in a plane parallel to and comprising the rotation axis 50 has a U-shape. Similarly, the axle member 3, and in particular a cross section of the axle member 3 in said plane likewise has a U-shape. In FIGS. 1 and 2 said plane is highlighted by an inclined hatching. More specifically, the U-shape steering knuckle 1 comprises a first arm portion 36 extending at least partially perpendicular to the rotation axis 50 and in parallel to a horizontal axis 60, a second arm portion 37 extending perpendicular to the rotation axis 50 and in parallel to the horizontal axis 60, and a connecting portion 38 connecting the first arm portion 36 and the second arm portion 37. Similarly, the U-shape axle member 3 comprises a first arm portion 33 extending at least partially perpendicular to the rotation axis 50 and in parallel to the horizontal axis 60, a second arm portion 34 extending perpendicular to the rotation axis 50 and in parallel to the horizontal axis 60, and a connecting portion 35 connecting the first arm portion 33 and the second arm portion 34.

In the embodiment depicted in FIG. 1, the U-shape formed by the steering knuckle 1 is open towards the left, and the U-shape formed by the axle member 3 is open towards the right. The axle member 3 is disposed in between the arm portions 36, 37 of the steering knuckle 1 along the rotation axis 50. More specifically, the arm portions 33, 34 of the axle member 3 are disposed in between the arm portions 36, 37 of the steering knuckle 1 along the rotation axis 50. This arrangement may facilitate the process of mounting the steering knuckle 1 on the axle member 3. It is likewise conceivable that in alternative embodiments not explicitly depicted here the steering knuckle 1 is disposed in between the arm portions 33, 34 of the axle member 3 along the rotation axis 50. For example, in that case the arm portions 36, 37 of the steering knuckle 1 could be disposed in between the arm portions 33, 34 of the axle member 3 along the rotation axis 50. Alternatively, the arm portions 33, 34 of the axle member 3 and the arm portions 36, 37 of the steering knuckle 1 could be arranged in an alternating manner along the rotation axis 50.

In the embodiment of the axle assembly 100 depicted in FIG. 1 the first arm portion 33 of the axle member 3 is rotatably connected with the first arm portion 36 of the steering knuckle 1 through the first king pin 2, and the second arm portion 34 of the axle member 3 is rotatably connected with the second arm portion 37 of the steering knuckle 1 through the second king pin 4. The steering knuckle 1 and the axle member 3 are shaped and arranged in such a way that they form or leave a clearance 40 in between the arm portions 33, 34 of the axle member 3 along the rotation axis 50. Further, the clearance 40 is disposed in between the arm portions 36, 37 of the steering knuckle 1 and in between the king pins 2, 4 along the rotation axis 50. As illustrated in FIGS. 2 and 3, the steering knuckle assembly 100 may further comprise a drive shaft 15 or joint 5 drivingly engaged with a wheel hub 6 which is configured to be steered by the steering knuckle 1. FIGS. 2 and 3 show that the clearance 40 may then be configured to allow the drive shaft 15 or the joint 5 to pass through the clearance 40 to drivingly engage the wheel hub 6.

In the steering knuckle assembly 100 depicted in the Figures, the first king pin 2 is non-rotatably mounted on the first arm portion 36 of the steering knuckle 1, and the second king pin 4 is non-rotatably mounted on the second arm portion 37 of the steering knuckle 1. The steering knuckle 1, and in particular the first arm portion 36 of the steering knuckle 1, comprises a first blind hole 11 formed in a surface of the steering knuckle 1. The first king pin 2 is non-rotatably mounted in the first blind hole 11. In particular, a portion of the first king pin 2 is mounted in the first blind hole 11 via a press fit. The press fit connection is between a portion of the steering knuckle 1 delimiting the first blind hole 11 and the portion of the first king pin 2 received in the first blind hole 11. The press fit connection provides a compressive force acting on the first king pin 2 in a direction perpendicular to the rotation axis 50. Friction between the steering knuckle 1 and the first king pin 2 fixes the first king pin 2 with respect to the steering knuckle 1 in a direction parallel to the rotation axis 50. Such a press fit connection can be particularly easy to manufacture and can typically be produced at low cost. For example, the steering knuckle 1 may be replaced without replacing a bearing mounted on the steering knuckle 1. Moreover, fixing elements which may otherwise protrude from the steering knuckle 1 toward the ground in a vertical direction, i. e. downward in the Figures, so that the steering knuckle assembly 100 requires less vertical space, in particular below the steering knuckle 1.

In order to mount the first king pin 2 on the steering knuckle 1 in a particularly stable torque-proof manner with respect to the rotation axis 50, the first blind hole 11 may have a circular or a non-circular cross section in a plane perpendicular to the rotation axis 50, and the portion of the first king pin 2 received or mounted in the first blind hole 11 may have correspondingly shaped circular or non-circular cross sections, as shown in FIGS. 5A and 5B. FIGS. 5A and 5B show a top view of the A-A plane indicated in FIG. 1, wherein the blind hole 11 and the portion of the king pin 2 received in the blind hole 11 have corresponding circular shapes (FIG. 5A) or oval shapes (FIG. 5B). It is understood that the cross section of the first blind hole 11 and of the portion of the first king pin 2 received in the first blind hole 11 perpendicular to the rotation axis 50 may have other non-circular shapes such as a polygonal shape or the like.

As depicted in FIG. 1, the steering knuckle assembly 100 is designed such that the steering knuckle 1, and in particular the first arm portion 36 of the steering knuckle 1, is part of a lowermost portion of the steering knuckle assembly 100 in a direction parallel to the rotation axis 50. Since the first king pin 2 is received in the first blind hole 11 from above and does not extend through the steering knuckle 1, the steering knuckle assembly 100 efficiently achieves a reduction in height by reducing the vertical space required for mounting the first king pin 2 on the steering knuckle 1. Consequently, a vehicle comprising the steering knuckle assembly 100 and having its wheels demounted has a reduced height with respect to vehicles including steering knuckle assemblies known from the prior art, thereby facilitating transportation or shipping of the vehicle and potentially reducing transportation or shipping costs.

As illustrated in the Figures, in particular in FIG. 1, the axle member 3 comprises a second blind hole 31 formed in a surface of the axle member 3, in particular in a surface of the first arm portion 33 of the axle member 3. The second blind hole 31 is arranged coaxially with respect to the rotation axis 50. A portion of the first king pin 2 protrudes upward from the first blind hole 11 of the first arm portion 36 of the steering knuckle 1 and is rotatably mounted in the second blind hole 31 of the first arm portion 33 of the axle member 3, thereby rotatably connecting the steering knuckle 1 and the axle member 3 with one another. As shown in FIG. 1, a bearing 13 may be additionally disposed within the second blind hole 31, and the first king pin 2 may then be at partially received in said bearing 13. For example, the bearing 13 may be an angular contact spherical plain bearing. However, it is understood that the bearing 13 may be configured as any type of bearing known in the art, such as a tapered roller bearing or the like.

A cross section of the portion of the first king pin 2 mounted or received in the first blind hole 11 has a first maximum diameter in a plane perpendicular to the rotation axis 50, and a cross section of the portion of the first king pin 2 protruding from the first blind hole 11 and rotatably received in the second blind hole 31 has a second maximum diameter in a plane perpendicular to the rotation axis 50, wherein the first maximum diameter is larger than the second maximum diameter. In the embodiment depicted in the Figures, an upward facing surface of the portion of the first king pin 2 received within the first blind hole 11 abuts and rests against a downward facing surface of the portion of the axle member 3 delimiting the second blind hole 31, thereby further stabilizing the first king pin 2 in the first blind hole 11.

The axle member 3, and in particular the second arm portion 34 of the axle member 3, further comprises a third blind hole 32 coaxial with the rotation axis 50. The second king pin 4 is rotatably mounted in the third blind hole 32. The second blind hole 31 and the third blind 32 hole point in opposite directions along the rotation axis 50. More specifically, the second blind hole 31 faces downward toward the first arm portion 36 of the steering knuckle 1, and the third blind hole 32 faces upward toward the second arm portion 37 of the steering knuckle 1. That is, the blind holes 31, 32 or the open ends of the blind holes 31, 32 face or point away from one another along the rotation axis 50.

The steering knuckle 1, and in particular the second arm portion 37 of the steering knuckle 1, comprises a through hole 12. The through hole 12 is coaxial with the axis or rotation 50. The second king pin 4 reaches through the through hole 12 of the steering knuckle 1. In the embodiment depicted in FIG. 1, the second king pin 4 is non-rotatably mounted on the steering knuckle 1, and in particular on the second arm portion 37 of the steering knuckle 1 via fixing members, more specifically by means of screws.

The steering knuckle assembly 100 further comprises a first lubrication channel 7 extending at least partially through the steering knuckle 1 and a second lubrication channel 8 in fluid communication with the first lubrication channel 7 and extending at least partially through the first king pin 2. The first lubrication channel 7 and the second lubrication channel 8 are configured to provide lubricant to an outside of the first king pin 2, in particular an outside of the portion of the first king pin 2 received in the second blind hole 31, for example in order to provide lubricant to the bearing 13 received in the second blind hole 31. The first lubricant channel 7 extends at least partially along the perpendicular axis 60 and the second lubricant channel 8 extends at least partially along the rotation axis 50 and perpendicular to the first lubricant channel 7. The embodiment of the steering knuckle assembly 100 depicted in FIG. 1 further comprises a greater 9. The greater 9 extends along the perpendicular axis 60. With this arrangement of the lubricant channels 7, 8, a required vertical space is kept as small as possible, while greasing of the first king pin 2 and the bearing 13 is enabled. As indicated in FIG. 1, the second king pin 4 may also comprise a lubricant channel 8' similar to the second lubricant channel 8 of the first king pin 2.

FIGS. 2 and 3 additionally show a further steering knuckle assembly 100' which is identical to the steering knuckle assembly 100. The features of the steering knuckle assembly 100' are indicated with primed reference signs. FIGS. 2 and 3 further illustrate that the axle member 3, 3' includes an axle housing 16, 16' which houses a drive shaft 15, 15' drivingly engaged with a differential 14.

Again, FIGS. 2 and 3 illustrate that the steering knuckle 1 is mounted on the axle member 3, and that the steering knuckle assembly 100 may further comprise a wheel hub 6 rotatably mounted on the steering knuckle 1, and a joint 5 drivingly connecting the drive shaft 15 with the wheel hub 6. And FIGS. 2 and 3 further illustrate that the joint 5 passes or reaches through the clearance 40 formed in between the arm portions 33, 34 of the axle member 3 and formed in between the first king pin 2 and the second king pin 4 along the rotation axis 50 of the steering knuckle assembly 100. Furthermore, the steering knuckle assembly 100 comprises a tie rod 10 pivotably mounted on the steering knuckle 1 at a distance from the rotation axis 50 of the steering knuckle assembly 100. The tie rod 10 is configured to actuate and control rotation of the steering knuckle 1 relative to the axle member 3 with respect to the rotation axis 50. In FIG. 2, a section of the tie rod 10 is highlighted by a hatched area to indicate that the tie rod 10 is mounted on the steering knuckle 1.

Figure 4:
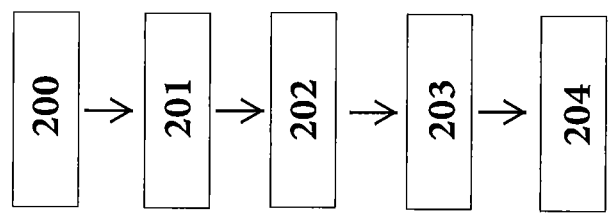
FIG. 4 shows a flow chart illustrating a method of assembling a steering knuckle assembly for a vehicle of the presently proposed type.

FIG. 4 shows a method of assembling a steering knuckle assembly such as the above-described steering knuckle assembly 100. The method comprises the step of non-rotatably mounting 200 the first king pin 2 in the first blind hole 11 formed in the surface of a steering knuckle 1 such that the first king pin 2 defines the rotation axis 50. The method further comprises the step of rotatably mounting 201 the portion of the first king 1 pin protruding out of the first blind hole 11 in the second blind hole 31 of the axle member 3, wherein the second blind hole 31 is formed in the surface of the axle member 3 and arranged coaxially with respect to the rotation axis 50 and/or the first blind hole 11.

Furthermore, the method comprises the step of passing 202 the drive shaft 15 or the joint 5 through the clearance 40 formed in between the first king pin 11 and the second king pin 31 along the rotation axis 50, wherein the drive shaft 15 or the joint 5 is drivingly engaged with the wheel hub 6 that is configured to be steered by the steering knuckle 1. The method also comprises the step of disposing 203 the axle member 3 between the arm portions 33, 34 of the steering knuckle 1, which may facilitate assembly of the steering knuckle assembly 100.

Additionally, the method comprises forming 204 the first lubrication channel 7 in the steering knuckle 1 and forming the second lubrication channel 8 in the first king pin 2 such that the second lubrication channel 8 is in fluid communication with the first lubrication channel 7, and such that the first and the second lubrication 7, 8 channels are configured such that lubricant may be provided to an outside of the first king pin 2 via the first and the second lubrication channels 7,8.

What is claimed is:

1. A steering knuckle assembly for a vehicle, comprising:
   a steering knuckle comprising a first blind hole formed in a surface of the steering knuckle, and
   a first king pin defining a rotation axis and non-rotatably mounted in the first blind hole, wherein the first blind hole has a non-circular cross section in a plane perpendicular to the rotation axis, and a portion of the first king pin mounted in the first blind hole has a correspondingly shaped non-circular cross section, such that the first king pin and the steering knuckle are engaged with one another in a torque-proof form fit with respect to the rotation axis.

2. The steering knuckle assembly according to claim 1, wherein the first king pin is mounted in the first blind hole via a press fit.

3. The steering knuckle assembly according to claim 1, further comprising an axle member, the first king pin rotatably connecting the steering knuckle with the axle member.

4. The steering knuckle assembly according to claim 3, wherein the axle member comprises a second blind hole formed in a surface of the axle member, wherein a portion of the first king pin protrudes out of the first blind hole and is rotatably mounted in the second blind hole.

5. The steering knuckle assembly according to claim 4, further comprising a second king pin coaxial with the first king pin with respect to the rotation axis, the second king pin rotatably connecting the steer-ing knuckle with the axle member.

6. The steering knuckle assembly according to claim 5, wherein the axle member further comprises a third blind hole coaxial with the second blind hole with respect to the rotation axis, wherein the second king pin is mounted in the third blind hole.

7. The steering knuckle assembly according to claim 6, wherein the second blind hole and the third blind hole face in opposite directions along the rotation axis, wherein the second blind hole and the third blind hole face away from one another along the rotation axis.

8. The steering knuckle assembly according to claim 7, wherein the second king pin is non-rotatably mounted on the steering knuckle and rotatably mounted on the axle member.

9. The steering knuckle assembly according to claim 8, wherein the steering knuckle comprises a through hole, wherein the second king pin is mounted in and reaches through the through hole of the steering knuckle.

10. The steering knuckle assembly according to claim 9, wherein that the steering knuckle and the axle member are configured such that they form a clearance in between the first king pin and the second king pin along the rotation axis so that a drive shaft or a joint may pass through the clearance.

11. The steering knuckle assembly according to claim 10, wherein a vehicle wheel hub and by a drive shaft or joint drivingly engaged with the vehicle wheel hub, wherein the steering knuckle is configured to steer the vehicle wheel hub and wherein the drive shaft or joint passes through the clearance formed in between the first king pin and the second king pin along the rotation axis.

12. The steering knuckle assembly according to claim 11, wherein the steering knuckle comprises a first arm portion extending at least partially perpendicular to the rotation axis, a second arm portion extending at least partially perpendicular to the rotation axis, and a connecting portion connecting the first arm portion and the second arm portion, wherein the first king pin is mounted on the first arm portion, the second king pin is mounted on the second arm portion, and the axle member is disposed in between the first arm portion and the second arm portion along the rotation axis.

13. The steering knuckle assembly according to claim 1, further comprising a first lubrication channel extending at least partially through the steering knuckle and a second lubrication channel in fluid communication with the first lubrication channel and extending at least partially through the first king pin, the first lubrication channel and the second lubrication channel configured to provide lubricant to an outside of the first king pin.

14. A method of assembling a steering knuckle assembly, the method comprising the steps of: non-rotatably mounting a first king pin in a first blind hole formed in a surface of a steering knuckle such that the first king pin defines a rotation axis, wherein a first lubrication channel extends at least partially through the steering knuckle and a second lubrication channel is in fluid communication with the first lubrication channel and extends at least partially through the first king pin, and wherein the first lubrication channel and the second lubrication channel are configured to provide lubricant to an outside of the first king pin.

15. A steering knuckle assembly for a vehicle, comprising:
- a steering knuckle comprising a first blind hole formed in a surface of the steering knuckle, and
- a first king pin defining a rotation axis and non-rotatably mounted in the first blind hole;
- a first lubrication channel extending at least partially through the steering knuckle; and
- a second lubrication channel in fluid communication with the first lubrication channel and extending at least partially through the first king pin, wherein the first lubrication channel and the second lubrication channel are configured to provide lubricant to an outside of the first king pin.

* * * * *